United States Patent
Yoo et al.

(10) Patent No.: US 8,243,562 B2
(45) Date of Patent: Aug. 14, 2012

(54) DIGITAL BROADCAST RECORDER AND METHOD FOR RECORDING DIGITAL BROADCAST

(75) Inventors: Young Taek Yoo, Suwon-si (KR); Cheon Seong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1796 days.

(21) Appl. No.: 11/385,731

(22) Filed: Mar. 22, 2006

(65) Prior Publication Data

US 2006/0250713 A1    Nov. 9, 2006

(30) Foreign Application Priority Data

May 6, 2005    (KR) .................... 10-2005-0038082

(51) Int. Cl.
*G11B 21/08*    (2006.01)
(52) U.S. Cl. .......... 369/30.03; 360/1; 386/239; 386/243
(58) Field of Classification Search ............... 369/30.03, 369/2, 6; 360/1; 386/214, 244, 336, 344, 386/83, 95, 87, 46, 239, 243, 248, 253, 261
See application file for complete search history.

(56) References Cited

U.S. PATENT DOCUMENTS 6,636,688 B1 *   10/2003   Otana ........................ 386/239
2006/0251390 A1 * 11/2006   Lim et al. .................... 386/95

FOREIGN PATENT DOCUMENTS

| JP | 2002027411 | 1/2002 |
| JP | 2003-153191 | 5/2003 |
| KR | 1020030030304 | 4/2003 |
| KR | 2004-79548 | 9/2004 |

OTHER PUBLICATIONS

KR Office Action issued Aug. 3, 2011 in KR Patent Application No. 10-2005-0038082.
Korean Office Action Issued on Mar. 30, 2012 in KR Patent Application No. 10-2005-0038082.

* cited by examiner

*Primary Examiner* — Ali Neyzari
(74) *Attorney, Agent, or Firm* — Stanzione & Kim, LLP

(57) ABSTRACT

A method for recording a digital broadcast, and a digital broadcast recording using the method, includes: recording start location data of a plurality of programs recorded during a recording mode of the digital broadcast; and indicating start locations of the individual programs using the start location data during an edition mode of the recorded digital broadcast.

28 Claims, 4 Drawing Sheets

DIGITAL BROADCAST RECORDER AND METHOD FOR RECORDING DIGITAL BROADCAST

CROSS-REFERENCE TO RELATED APPLICATION

This application claims the benefit of Korean Patent Application No. 2005-38082, filed on May 6, 2005 in the Korean Intellectual Property Office, the disclosure of which is incorporated herein by reference.

BACKGROUND OF THE INVENTION

1. Field of the Invention

Aspects of the present invention relate to a digital broadcast recorder and a method for recording a digital broadcast, and more particularly, to a digital broadcast recorder and a method for recording a digital broadcast, which record a program change location when the digital broadcast is recorded, inform a user of the recorded program change location when the recorded digital broadcast is edited, and allow the user to easily edit the recorded digital broadcast.

2. Description of the Related Art

In recent times, digital broadcast technology has been rapidly developed in many countries throughout the world. Digital broadcasting is a broadcast scheme for compressing a television (TV) signal into a digital signal, and transmitting the compressed digital signal to a plurality of TV viewers. A conventional analog TV broadcast must load only one video or image signal in a single broadcast signal, and must transmit a voice or audio signal via the other broadcast signal. However, the digital broadcast can load a plurality of video signals or a plurality of audio signals in such a single broadcast signal, does not deteriorate a signal quality even though the video and audio signals are compressed, and can establish a plurality of channels in a frequency band of a single channel.

The digital broadcast provides a digital broadcast receiver for receiving a digital broadcast signal (e.g., a digital TV, a set-top box, and a Personal Video Recorder (PVR), etc.) with an Electronic Program Guide (EPG) service for displaying program schedules of individual channels. Therefore, the above-mentioned digital broadcast receiver extracts schedule information from the received digital broadcast signal, and displays the extracted schedule information to a user. If the user selects a desired channel, the digital broadcast receiver is tuned to the selected channel. Also, when the digital broadcast is recorded in a digital broadcast recorder (e.g., a Blu-ray Disc (BD) recorder), the user recognizes a broadcast time of a desired program to be reserved using the EPG service, and establishes a general recording or a reserved recording of the desired program.

However, where a plurality of programs are simultaneously recorded in the conventional digital broadcast recorder and are then edited by the user, the conventional digital broadcast recorder cannot easily search for start and end locations of a desired program to be deleted from among the programs, resulting in the occurrences of both unnecessary time consumption and greater inconvenience during the edition process of the programs. In order to obviate the above-mentioned problems, Japanese Patent Laid-open No. 2003-153191 has disclosed a method for indicating a variety of marks on a recorded image upon receiving a desired mark signal from a user during the recording time of the image, and editing the recorded image by referring to the marks. However, the method shown in Japanese Patent Laid-open No 2003-153191 has a disadvantage in that the user must continuously enter a mark signal, resulting in greater inconvenience of use.

SUMMARY OF THE INVENTION

Therefore, it is an aspect of the invention to provide a digital broadcast recorder and a method for recording a digital broadcast, which automatically record a program change location during the recording of a digital broadcast, and inform a user of the recorded program change location when the recorded digital broadcast is edited.

Additional aspects and/or advantages of the invention will be set forth in part in the description which follows and, in part, will be obvious from the description, or may be learned by practice of the invention.

In accordance with one aspect of the invention, a method for recording a digital broadcast includes: recording start location data of a plurality of programs recorded during a recording mode of the digital broadcast; and indicating start locations of the individual programs using the start location data during an edit mode of the recorded digital broadcast.

According to an aspect of the invention, the method further comprises: recording start location data of a first program indicative of an initial program received during the recording mode; analyzing broadcast information contained in a digital broadcast signal; determining whether the first program is changed to a second program; and if the first program is changed to the second program, recording start location data of the second program.

According to an aspect of the invention, the broadcast information is indicative of meta data, and determines whether the first program is changed to the second program by determining whether a title contained in the meta data is changed.

According to an aspect of the invention, the start location is displayed in a record location display area capable of displaying start images of individual programs and a record location of a selected start image from among the start images of the individual programs.

According to an aspect of the invention, the start location is displayed in a record location display area capable of displaying start images of individual programs and a record time of a selected start image from among the start images of the individual programs.

According to an aspect of the invention, the start images of the individual programs are displayed in the form of a thumbnail.

In accordance with another aspect of the present invention, there is provided a method for recording a digital broadcast comprising: receiving a digital broadcast signal, and storing the received digital broadcast signal in a storage medium; analyzing meta data contained in the digital broadcast signal, and determining whether a received program is changed; and if the received program is changed, recording change location data of the program.

In accordance with still another aspect of the present invention, there is provided a digital broadcast recorder comprising: a digital tuner for receiving a digital broadcast signal of a user-selected channel; a broadcast information reader for reading broadcast information contained in the digital broadcast signal; a controller for analyzing the broadcast information to determine whether a received program is changed, and controlling start location data of the changed program to be recorded; and a recorder for recording the program in a storage medium.

According to an aspect of the invention, the broadcast information is indicative of meta data, and determines whether the program is changed by determining whether a title contained in the meta data is changed.

According to an aspect of the invention, the digital broadcast recorder records the start location data in a start location storage unit or the storage medium.

According to an aspect of the invention, the digital broadcast recorder includes a Blu-ray Disc (BD) recorder or a Personal Video Recorder (PVR).

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
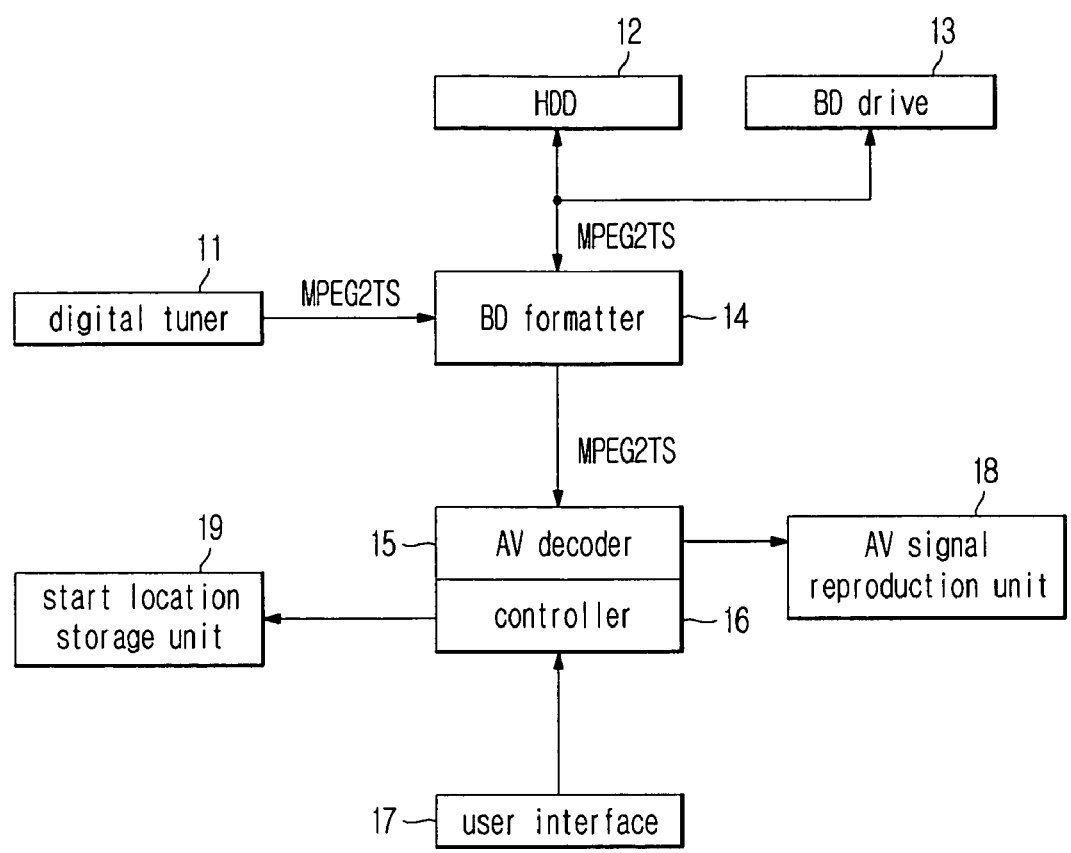
FIG. 1 is a block diagram illustrating a Blu-ray Disc (BD) recorder acting as one of digital broadcast recorders according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

FIG. 1 shows a Blu-ray Disc (BD) recorder, which is one type of digital broadcast recorders usable with an embodiment of the present invention. The BD recorder includes a digital tuner 11, a BD formatter 14, a Hard Disc Drive (HDD) 12, a BD drive 13, an audio-video (AV) decoder 15, a controller 16, an AV signal reproduction unit 18, a user interface 17, and a start location storage unit 19. The digital tuner 11 receives a digital broadcast signal (e.g., Advanced Television System Committee (ATSC)) of a user-desired channel, and converts the received digital broadcast signal into an MPEG2 transport stream (TS). The BD formatter 14 converts the MPEG2 transport stream received from the tuner 11 into a predetermined standard signal capable of being easily stored in a BD, or loads an additional signal (e.g., an encryption prevention signal, etc.) in the MPEG2 transport stream. The BD drive 13 receives a BD compliant disc, and stores the MPEG2 transport stream received from the BD formatter 14 on the BD. While not required in all aspects, it is understood that the recorder can further reproduce the data recorded on the BD and the HDD 12.

The AV decoder 15 decompresses the MPEG2 transport stream received from the BD formatter 14, converts the decompressed MPEG2 transport stream into a video signal (e.g., a composite signal, and a component signal, etc.) and an audio signal, and reads meta data contained in the MPEG2 transport stream. The meta data includes content description meta data indicative of broadcast content information, instance description meta data indicative of broadcast schedule information, consumer meta data indicative of content data associated with a consumer or user; and segmentation meta data indicative of interval information of the broadcast content data. However, it is understood that the meta data can include other information in addition to or instead of the above exemplary information.

The content description meta data includes program information, group information, credit information, and program review information. The program information represents detailed information associated with a program, for example, a title, a synopsis, a genre, a language, and a cast of the program. The group information represents information for grouping a plurality of programs according to group types (e.g., a series, a show, and a program concept, etc.). The credit information represents various credit information associated with a program. For example, the credit information can be director-, actor or actress-, producer-, writer-, and/or cast information of the program. The program review information represents a critical opinion associated with the program.

The instance description meta data includes program location information and service information. The program location information represents time and medium information of the broadcast program. The service information represents broadcast station information, for example, name-, URL-, logo-, main service genre-, and ID information of the broadcast station.

The user meta data includes a usage history and a user preference. The usage history is indicative of an action history indicative of a consumption type of broadcast contents of the user. The user preference is indicative of preference information associated with broadcast contents of the user.

The segmentation meta data includes segment information and segment group information. The segment information includes a program ID associated with a segment, a segment title, and a segment synopsis, etc. The segment group information is indicative of a segment group for grouping segments into a single concept.

The controller 16 receives meta data from the AV (Audio/Video) decoder 15, detects a program title from the program information contained in the content description meta data, and determines whether a received program is changed to another program on the basis of the detected program title. If it is determined that the received program is changed to another program, the controller 16 records start location data (i.e., a program change location between two programs) of the changed program. For example, if an initially-received program title is changed from a first broadcast title "MBC apple tree" to a second broadcast title "MBC exclamation mark", the controller 16 records the start location data of the second broadcast title "MBC exclamation mark" in the start location storage unit 19.

In the shown example, the start location data is indicative of location information of a storage medium containing the MPEG2 transport stream capable of constructing an image at a start location of a corresponding program. For example, if the storage medium is the HDD 12, the storage medium location information is indicative of a memory address. If the storage medium is the BD, the storage medium location information is indicative of a track location. Also, while the start location data is shown as recorded in the start location storage unit 19 of the BD recorder, the start location data can also be recorded directly on the HDD 12 or the BD instead of or in addition to the start location storage unit 19. In order to perform the editing process in other BD recorders, it is preferable that the start location data be recorded in the BD. The start location storage unit 19 stores the aforementioned start location data therein, and comprises an internal memory of the controller 16 or a RAM (not shown) as necessary.

The AV signal reproduction unit 18 receives video and audio signal from the AV decoder 15, and converts the video and audio signals into specific signals capable of being displayed on a display, such as a TV, plasma display panel (PDP), liquid crystal display (LCD), an organic light-emitting diode (OLED), or other like display. For example, if the display displays an NTSC TV signal, the AV signal reproduction unit 18 converts the video signal received from the AV decoder 16 into a specific signal suitable for the NTSC standard, and transmits the converted result to the TV. However, if the display is a digital TV, the video and audio signals received from the AV decoder 15 are directly transmitted to the digital TV without passing through the AV signal reproduction unit 18. As such, the reproduction unit 18 need not be used in all aspects of the invention.

Figure 2:
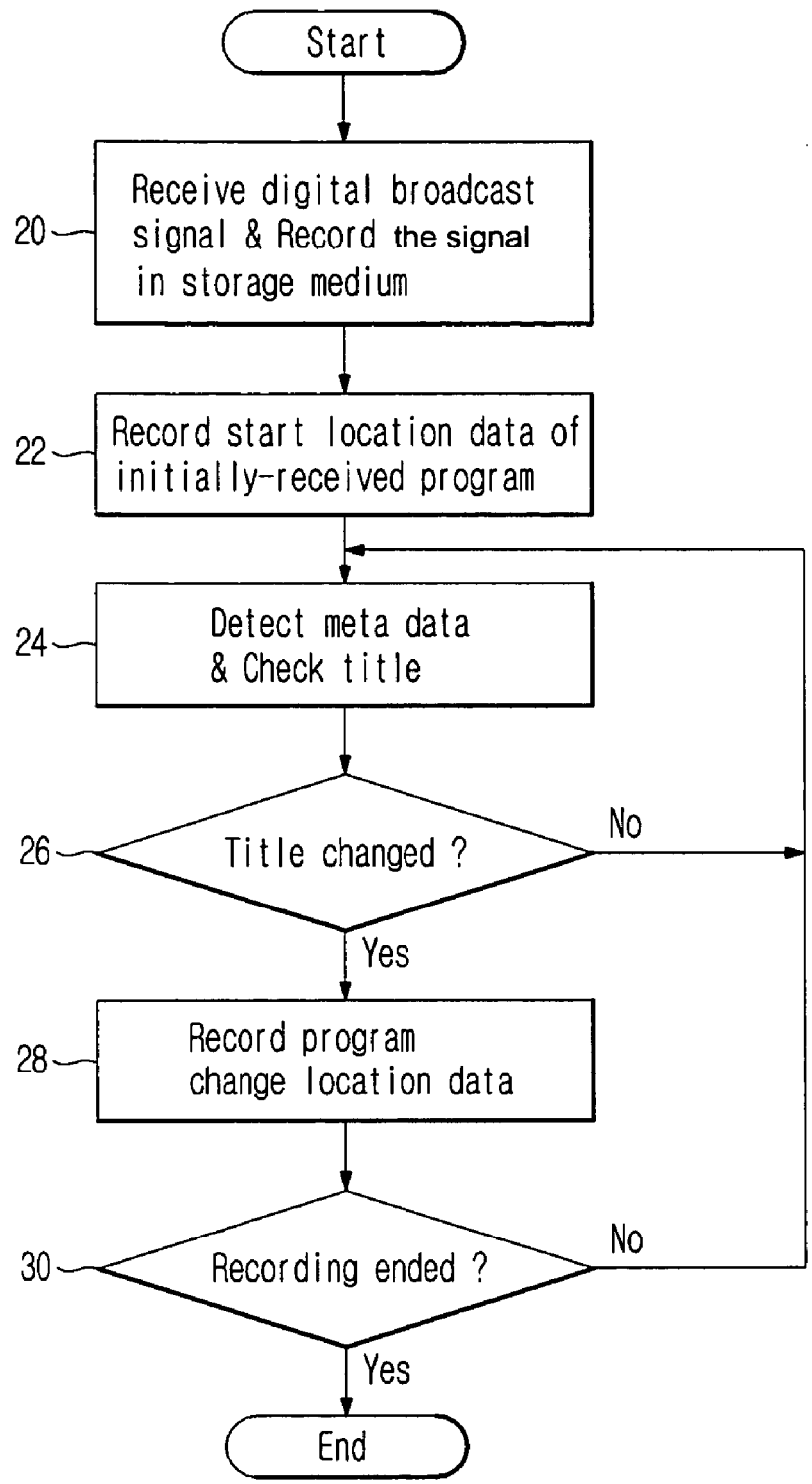
FIG. 2 is a flow chart illustrating a method for recording a program change location when the BD recorder shown in FIG. 1 performs a recording process according to an embodiment of the present invention.

A method of recording a digital broadcast according to an embodiment of the present invention will hereinafter be described with reference to FIG. 2. Referring to FIGS. 1 and 2, if a user selects a desired channel using the user interface 17, and enters a record command associated with the selected channel, the digital tuner 11 receives a digital broadcast signal of the user-selected channel, and converts the received digital broadcast signal into an MPEG2 transport stream. The MPEG2 transport stream is converted into a specific signal format capable of being stored in the BD or the HDD 12, such that the converted result is stored in the BD or the HDD 12 at operation 20. In this case, start location data of the initially-received program is recorded in either the start location storage unit 19 or a specific storage medium (e.g., the HDD 12 or the BD) recording the program at operation 22.

The MPEG2 transport stream is also transmitted to the AV decoder 15. The AV decoder 15 reads meta data contained in the MPEG2 transport stream. The controller 16 recognizes a title contained in the meta data at operation 24, and determines whether a title is changed to another title at operation 26. If the received program title is not changed at operation 26, the operation process returns to operation 24. Otherwise, if the received program title is changed at operation 26, the controller 16 stores start location data of a changed program in the start location storage unit 18 or the storage medium (e.g., the HDD 12 or the BD) recording the program at operation 28.

Figure 3:
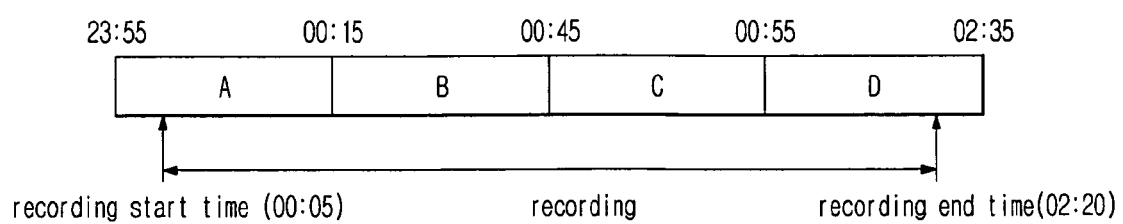
FIG. 3 is an example of a program recorded by the BD recorder shown in FIG. 1 according to an embodiment of the present invention.

The controller 16 determines whether the recording operation is terminated at operation 30. If the recording operation is not terminated at operation 30, the operation process returns to operation 24. Otherwise, if the recording operation is terminated at operation 30, the operation process is terminated. In the case of simultaneously recording A, B, C, and D programs shown in FIG. 3 using the above-mentioned method, program start locations (i.e., program change locations) of the A, B, C, and D programs are determined to be 00:05, 00:15, 00:45, and 00:55, respectively. The record location (i.e., start location data) of the MPEG2 transport stream capable of constructing an image at individual start locations is stored in the start location storage unit 19, the HDD 12, or the BD.

Figure 4:
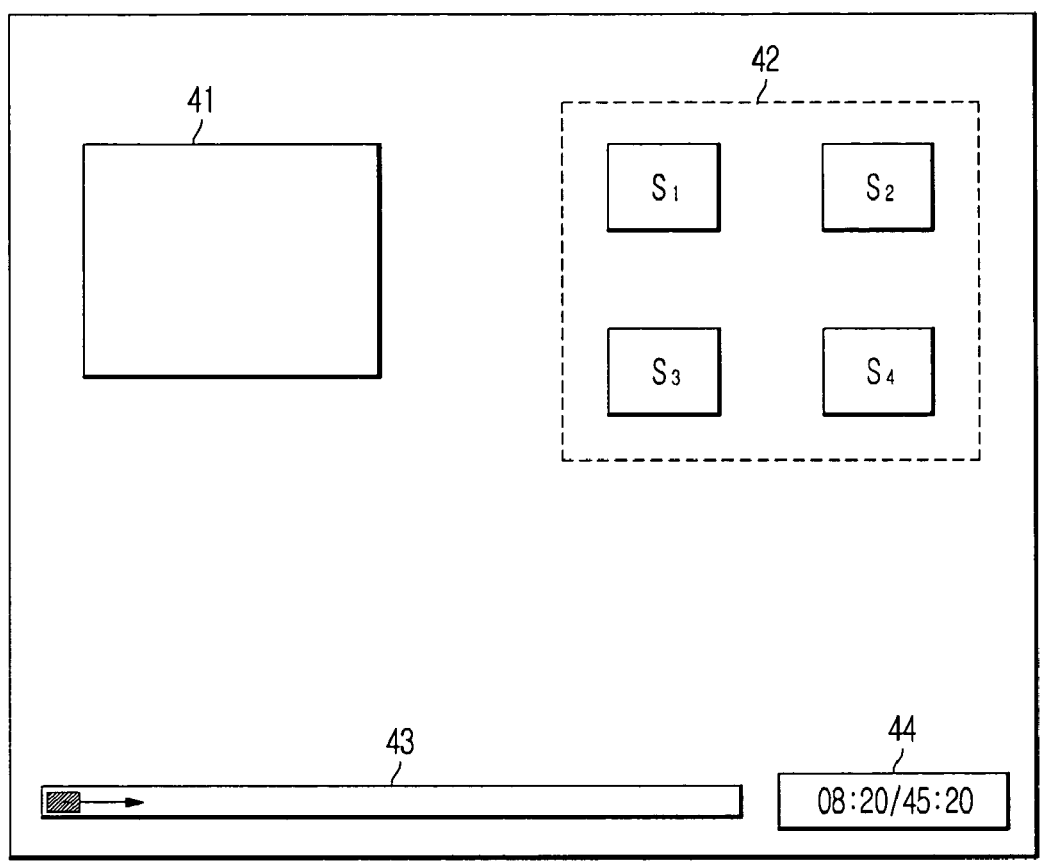
FIG. 4 is an example of start images of individual programs displayed on a display connected to the BD recorder shown in FIG. 1 during an edition mode according to an embodiment of the present invention.

If the recording process is performed via the aforementioned operations, and the user enters an edit command, the BD recorder displays start images of individual programs on a display connected to the BD recorder. As can be seen from FIG. 4, the edit image for editing a recorded image includes a Picture In Picture (PIP) window 41 for displaying a recorded image at an upper left side of the image, and a start image display area 42 for indicating start images (S1, S2, S3, and S4) of individual programs at the right side of the PIP window 41. In the edit mode, the controller 16 recognizes start locations of individual programs by referring to start location data stored in a variety of storage media, and sequentially displays images of individual start locations (i.e., individual program start images) on the start image display area 42. In this case, it is preferable that individual program start images S1, S2, S3, and S4 be displayed in the form of a thumbnail. However, it is understood that other forms of display can be used, such as by title alone.

In the meantime, a record location display area 43 for indicating a record location of the image displayed on the PIP window 41 is also positioned at a lower part of the edit image. The record location display area 43 includes a long rail formed in a horizontal direction, and a scroll bar moving along the rail. The longer the image display time of the PIP window, the closer the scroll bar is to the right side of the rail. If the user selects a single start image from among a plurality of start images contained in the start image display area 42, the scroll bar moves to a specific location corresponding to a record location of the selected start image, such that it informs a user of start location information of individual programs from among overall titles.

A record time display area 44 is located at the right side of the record location display area 43. The record time display area 44 displays a record time of an image displayed on the PIP window 41. If the user selects one of start images, the record time display area 44 displays a record time of the selected start image in the same manner as in the record location display area 43, such that the record time display area 44 informs a user of time information of the start locations of individual programs from among overall titles. Therefore, the user can easily perform the editing process by referring to the aforementioned edition images.

For example, if a user who desires to delete the B program selects the start image S2 of the B program, the scroll bar of the record position display area 43 moves to the start location of the B program, and the record time display area 44 displays a start time of the B program. In addition, the B program is displayed on the PIP window 41. If the user selects a deletion command using the aforementioned edition method after detecting the start location pf the B program, the B program can be easily deleted.

Although the present invention uses the BD recorder as the digital broadcast recorder, it should be noted that the present invention can also be applied not only to the BD recorder but also to other digital broadcast recorders (e.g., a Personal Video Recorder (PVR), and a set-top box including an HDD, and/or personal computers performing digital broadcast recording). Further, it is understood that aspects can be used in other recording beyond BD and/or hard drives, such as HD-DVD, Advanced Optical Disc (AOD), DVD, CDs, or other digital optical and/or magnetic recording media. Moreover, while MPEG2 transport streams are described, it is understood that the present invention is usable with other transport streams, such as MPEG4 or digital video broadcast (DVB) type standards.

While shown as internal, it is understood that the HDD 12 and/or the BD drive 13 can be an external drive to the receiver such that the receiver and recording units are separate. Lastly, while shown with two recording media, it is understood that the invention can use only a single recording medium.

As is apparent from the above description, a digital broadcast recorder and a method for recording a digital broadcast according to an embodiment of the present invention record a program change location (i.e., a program start location) when a plurality of programs are simultaneously recorded, inform a user of the recorded program change location when the recorded programs are edited, and allow the user to easily edit the recorded programs.

While not required in all aspects, the method or elements thereof can be encoded on one or more computer readable media readable using one or more general or special purpose computers and/or can be encoded as firmware.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for recording a digital broadcast comprising:
automatically recording start location data of a plurality of programs recorded during a recording mode of the digital broadcast by detecting properties of the programs being recorded, wherein the recording comprises:
recording first start location data of a first one of the programs indicative of an initial program received during the recording mode,
analyzing broadcast information contained in the digital broadcast,
determining whether the first program is changed to a second one of the programs, and
if the first program is changed to the second program, recording second start location data of the second program; and
indicating start locations of the individual programs using the start location data during an edit mode of the recorded digital broadcast.

2. The method according to claim 1, wherein the broadcast information includes meta data, and the determining comprises determining whether the first program is changed to the second program by determining whether a title contained in the meta data is changed.

3. The method according to claim 1, wherein the start locations are displayed in a record location display area capable of displaying start images of individual programs and a record location of a selected start image from among the start images of the individual programs.

4. The method according to claim 1, wherein the start location are displayed in a record location display area capable of displaying start images of individual programs and a record time of a selected start image from among the start images of the individual programs.

5. The method according to claim 3, wherein the start images of the individual programs are displayed in the form of a thumbnail.

6. A method for recording a digital broadcast comprising:
receiving a digital broadcast signal including a plurality of programs;
storing at least one of the programs of the received digital broadcast signal on at least one storage medium;
analyzing meta data contained in the digital broadcast signal;
recording start location data corresponding to the analyzed meta data in a start location storage unit or a storage medium;
determining from the analyzed meta data whether the program being stored is changed to another program being received; and
if the program is determined to have been changed, recording change location data of the program.

7. A digital broadcast recorder comprising:
a digital tuner to receive a digital broadcast signal of a user-selected channel, the digital broadcast signal including a plurality of programs;
a broadcast information reader to read broadcast information contained in the digital broadcast signal;
a controller to analyze the read broadcast information to determine whether a received program is changed to another one of the plurality of programs, and to record start location data of the changed program to be recorded;
a recorder to record the received program on at least one storage medium and to record the changed program, and
a start location storage unit, wherein the digital broadcast recorder records the start location data in the start location storage unit or the at least one storage medium.

8. The digital broadcast recorder according to claim 7, further comprising a start location storage unit, wherein the digital broadcast recorder records the start location data in the start location storage unit or the at least one storage medium.

9. The digital broadcast recorder according to claim 7, wherein the digital broadcast recorder comprises a Blu-ray Disc (BD) recorder and/or a Personal Video Recorder (PVR).

10. The method according to claim 4, wherein the start images of the individual programs are displayed in the form of a thumbnail.

11. At least one computer readable medium encoded with programming instructions for implementing the method according to claim 6 using at least one computer.

12. A method for recording a digital broadcast comprising a plurality of programs comprising:
detecting from a change in a program property of the received digital broadcast a change between a first one of the programs being recorded on a medium to a second one of the programs to be recorded on the medium; and
upon detecting the change in the program property, recording start location data indicating a location on the medium at which the first program changes to the second program,
wherein the first and second programs are received on an apparatus having a plurality of media, and the start location data indicates a location on which of the media the first program changes to the second program.

13. The method of claim 12, wherein one of the plurality of media is a non-volatile writable memory internal to the apparatus, and another one of the plurality of media is a writable medium received at a drive of the apparatus and which is removable from the drive for use in other drives.

14. The method of claim 13, wherein the another medium is a writable optical recording medium, and the start location data indicates a location at a track of the optical recording medium.

15. The method of claim 13, wherein the one medium is a hard drive, and the start location data indicates a memory location of the hard drive.

16. The method of claim 12, wherein the program property comprises meta data, and the detecting comprises detecting a change in the meta data in order to determine the change between the first and the second programs.

17. The method of claim 16, wherein the meta data comprises data on a title of the corresponding program, and the detecting comprises detecting a change in a title of the first program to a title of the second program.

18. The method of claim 12, further comprising recording the start location data on the storage medium storing the first and second programs.

19. The method of claim 15, further comprising recording the start location data in a memory of a receiver receiving the first and second programs.

20. A digital broadcast receiver to receive a digital broadcast signal including a plurality of programs, the receiver comprising:
- a broadcast receiver to receive the digital broadcast signal and to read broadcast information contained in the received digital broadcast signal;
- a controller to analyze the read broadcast information to determine whether a program of the received digital broadcast signal currently being recorded is changed to another one of the plurality of programs being received with the received digital broadcast signal, to record start location data of the another program to be recorded when the program is determined to have been changed, and to record the program and the another program on at least one storage medium, wherein the start location data indicates where on the at least one storage medium the another program begins; and
- a plurality of media on which the programs are recorded, and the start location data indicates a location on which of the media the program changes to the another program.

21. The digital broadcast receiver of claim 20, wherein one of the media is a non-volatile writable memory internal to the receiver, and another one of the media is a writable medium received at a drive of the apparatus and which is removable from the drive for use in other drives.

22. The digital broadcast receiver of claim 21, wherein the another medium is a writable optical recording medium, and the start location data indicates a location at a track of the optical recording medium.

23. The digital broadcast receiver of claim 21, wherein the one medium is a hard drive, and the start location data indicates a memory location of the hard drive.

24. The digital broadcast receiver of claim 20, wherein the controller analyzes meta data included in the read broadcast information, and detects whether the program being recorded is changed to the another program where there is a change in the meta data.

25. The digital broadcast receiver of claim 24, wherein the meta data includes a title of the corresponding program, and the controller detects whether the program being recorded is changed to the another program where there is a change in the title included in the read meta data.

26. The digital broadcast receiver of claim 20, further comprising a memory storing the start location data, wherein the controller further records the start location data in the memory and on the storage medium storing the programs.

27. A method for recording a digital broadcast, the method comprising:
- receiving a digital broadcast signal including a plurality of programs;
- storing the plurality of programs of the received digital broadcast signal in one or more different storage units;
- analyzing meta data contained in the digital broadcast signal;
- determining from the analyzed meta data whether a property of at least one of the programs being recorded is changed; and
- recording change location data of the programs according to a change of the property of the changed program,
- wherein the one or more different storage units have storing formats different from each other.

28. The method of claim 27, wherein the change location data comprises track information or memory location information according to a type of the one or more different storage units.

* * * * *